(12) United States Patent
Qu et al.

(10) Patent No.: US 11,079,016 B2
(45) Date of Patent: Aug. 3, 2021

(54) SIX-GEAR AUTOMATIC TRANSMISSION FOR AUTOMOBILE WITH BRUSHLESS CONTROL-BY-WIRE CENTRIFUGAL BALL ARM ENGAGEMENT DEVICE

(71) Applicant: Shandong University of Technology, Zibo (CN)

(72) Inventors: Jinyu Qu, Zibo (CN); Chuanbo Ren, Zibo (CN); Zhuowen Zhao, Zibo (CN); Jiashan Mi, Zibo (CN); Nana Lv, Zibo (CN); Zhengbin Guo, Zibo (CN); Pan Zhang, Zibo (CN); Jihua Wang, 255012 (CN)

(73) Assignee: SHANDONG UNIVERSITY OF TECHNOLOGY, Shandong (CN)

( * ) Notice: Subject to any disclaimer, the term of this patent is extended or adjusted under 35 U.S.C. 154(b) by 341 days.

(21) Appl. No.: 16/075,322

(22) PCT Filed: Dec. 28, 2017

(86) PCT No.: PCT/CN2017/119179
§ 371 (c)(1),
(2) Date: Aug. 3, 2018

(87) PCT Pub. No.: WO2018/126974
PCT Pub. Date: Jul. 12, 2018

(65) Prior Publication Data
US 2019/0040953 A1 Feb. 7, 2019

(30) Foreign Application Priority Data
Jan. 9, 2017 (CN) .......................... 201710014413.9

(51) Int. Cl.
*F16H 3/093* (2006.01)
*F16H 63/34* (2006.01)
(Continued)

(52) U.S. Cl.
CPC ......... *F16H 63/3458* (2013.01); *F16H 3/093* (2013.01); *F16H 63/3043* (2013.01);
(Continued)

(58) Field of Classification Search
CPC ............ F16H 3/093; F16H 2003/0935; F16H 2200/0052; F16H 2200/2048; F16D 27/08; F16D 27/14
(Continued)

(56) References Cited

U.S. PATENT DOCUMENTS 5,810,141 A * 9/1998 Organek ................. F16D 13/04
192/35
6,880,688 B2 * 4/2005 Matsumoto ........... F16D 27/115
192/35
(Continued)

FOREIGN PATENT DOCUMENTS

CN 1393354 A 1/2003
CN 204852195 U 12/2015
(Continued)

*Primary Examiner* — William C Joyce
(74) *Attorney, Agent, or Firm* — Hickman Becker Bingham Ledesma LLP

(57) ABSTRACT

A six-gear automatic transmission device is provided for automobiles with a brushless control-by-wire centrifugal ball arm engagement. One brushless control-by-wire centrifugal ball arm engagement device is provided between each gear input gear and each gear driving gear; and by controlling the engagement and disengagement of the brushless control-by-wire centrifugal ball arm engagement device, the shifting control of the six-gear automatic transmission for automobile with a brushless control-by-wire centrifugal ball arm engagement device is performed. The technology provides advantages including compact struc-
(Continued)

ture, being capable of dynamic gear-shift, no mechanical or hydraulic gear-shift components and low operational energy consumption.

8 Claims, 5 Drawing Sheets

(51) Int. Cl.
*F16H 63/30* (2006.01)
*F16H 61/04* (2006.01)
*F16H 61/28* (2006.01)

(52) U.S. Cl.
CPC ...... *F16H 61/0403* (2013.01); *F16H 61/2807* (2013.01); *F16H 2003/0935* (2013.01); *F16H 2063/3046* (2013.01); *F16H 2200/0052* (2013.01); *F16H 2200/2048* (2013.01); *F16H 2306/48* (2013.01)

(58) Field of Classification Search
USPC .......................................................... 74/335
See application file for complete search history.

(56) References Cited

U.S. PATENT DOCUMENTS

| | | | | |
|---|---|---|---|---|
| 6,905,008 B2* | 6/2005 | Kowalsky | ............. | F16D 27/115 |
| | | | | 192/35 |
| 6,935,475 B2* | 8/2005 | Weilant | ................ | F16D 27/115 |
| | | | | 180/247 |
| 2010/0236888 A1* | 9/2010 | Pritchard | ................ | F16D 27/14 |
| | | | | 192/35 |

FOREIGN PATENT DOCUMENTS

| | | |
|---|---|---|
| CN | 106763736 A | 5/2017 |
| CN | 206361139 U | 7/2017 |
| GB | 881724 | 11/1961 |

* cited by examiner

SIX-GEAR AUTOMATIC TRANSMISSION FOR AUTOMOBILE WITH BRUSHLESS CONTROL-BY-WIRE CENTRIFUGAL BALL ARM ENGAGEMENT DEVICE

The present application claims priority to a Chinese patent application No. 201710014413.9, filed on Jan. 9, 2017, with a title of "AUTOMATIC TRANSMISSION FOR AUTOMOBILE WITH BRUSHLESS CONTROL-BY-WIRE CENTRIFUGAL BALL ARM ENGAGEMENT DEVICE", which is incorporated herein by reference in its entirety.

TECHNICAL FIELD

The present invention is involved in the field of automobile power transmission technologies and relates to an automobile automatic transmission, and more particularly, to a six-gear automatic transmission for automobile with a brushless control-by-wire centrifugal ball arm engagement device.

BACKGROUND

Automatic transmission is widely used in automobiles, electric vehicle, construction machinery and the like. The conventional automatic transmission can be classified mainly as the following four types: Automatic Transmission (AT), Continuously Variable Transmission (CVT), Automated Manual Transmission (AMT) and Dual Clutch Transmission (DCT). The shifting processes of above four types of automatic transmission are all controlled by an electrically controlled hydraulic servo device including a hydraulic pump, a plurality of hydraulic valves, a plurality of hydraulic clutches and a plurality of brakes, etc, which involves a complex structure, high cost and high energy consumption during operation.

With widespread application of such technologies as automobile electronic, automatic control and automobile network communication, the X-by-wire technique has become the tendency of vehicle development in the future. The X-by-wire technique replaces mechanical and hydraulic systems with electric wires, electronic controllers and wire control actuators by converting the driver's manipulation into electrical signals with a sensor; the electrical signals are input to an electric control unit where a control signal is generated to drive wire control actuators to perform a desired operation. Therefore, developing a new X-by-wire automatic transmission helps reduce the number of parts, reduce cost and energy consumption and improve transmission efficiency.

A Chinese patent application No. CN201410469568.8 titled "MULTI-SPEED RING-ARRANGED CONTROL-BY-WIRE AUTOMATIC TRANSMISSION" and a patent application No. CN201410468564.8 titled "DOUBLE-LEVEL MULTI-SPEED CONTROL-BY-WIRE AUTOMATIC TRANSMISSION" was published on Jan. 21, 2015; a Chinese patent application No. CN201410469720.2 titled "ELECTRIC VEHICLE THREE-GEAR CONTROL-BY-WIRE AUTOMATIC TRANSMISSION" and a patent application No. CN201410471726.3 titled "ELECTRIC VEHICLE MULTI-SPEED CONTROL-BY-WIRE AUTOMATIC TRANSMISSION" was published on Mar. 4, 2015; a Chinese patent application No. CN201520311494.5 titled "MULTI-SPEED CONTROL-BY-WIRE AUTOMATIC TRANSMISSION" was published on Oct. 28, 2015. The published patents above have no hydraulic shifting elements, with the transmission gears of each gear normally engaged, and on the transmission path of each gear, there is an electromagnetic clutch respectively, whose engagement and disengagement are controlled by an electric control unit, thereby performing a shift-by-wire process. However, in each of the above patents, the electromagnetic clutch used for implementing the shift-by-wire process has such disadvantages as bulky volume, low rotation speed and requirement for large power consumption. Therefore, the X-by-wire automatic transmission is large in size, low in rotational speed and has great operation energy consumption.

SUMMARY

It is an object of the present invention to overcome the shortcomings of the conventional automatic transmissions by providing a novel six-gear automatic transmission for automobile with a brushless control-by-wire centrifugal ball arm engagement device which can not only perform power shifting, but also has a simple structure, low cost and low operation energy consumption. The technical solutions of the present invention are as follows:

A six-gear automatic transmission for automobile with a brushless control-by-wire centrifugal ball arm engagement device, which includes an input shaft, an output shaft, an input gear, an input gear of first gear, an input gear of second gear, an input gear of third gear, an input gear of fifth gear, an input gear of sixth gear, an input gear of reverse gear, a driving gear of first gear, a driving gear of second gear, a driving gear of third gear, a driving gear of fifth gear, a driving gear of sixth gear, a driving gear of reverse gear; said input gear is fixedly mounted on the input shaft, and normally engaged with the input gear of first gear, the input gear of second gear, the input gear of third gear, the input gear of fifth gear, the input gear of sixth gear and the input gear of reverse gear respectively along its outer circumference.

The six-gear automatic transmission is characterized in that: the six-gear automatic transmission further includes seven brushless control-by-wire centrifugal ball arm engagement devices, a brushless electromagnet of first gear, a brushless electromagnet of second gear, a brushless electromagnet of third gear, a brushless electromagnet of fourth gear, a brushless electromagnet of fifth gear, a brushless electromagnet of sixth gear, a brushless electromagnet of reverse gear.

The brushless control-by-wire centrifugal ball arm engagement device each includes a thrust pressing disc, a driven inner-spline hub, a control-by-wire driving disc, a preloading spring, a centrifugal ball arm hollow disc, centrifugal ball arm pins, centrifugal ball arms, centrifugal balls, a magnetic conductive force transmitting disk, centrifugal ball sockets and a drive shaft; the centrifugal ball arm hollow disc is rotatably supported on the drive shaft by a bearing, and is provided with outer-spline grooves of centrifugal ball arm hollow disc on the outer circumferential surface of its one end; the control-by-wire drive disc is arranged on the outer-spline grooves of centrifugal ball arm hollow disc by its inner-spline grooves; the preloading spring is disposed between the end of the outer-spline grooves of centrifugal ball arm hollow disc and the inside end face of the control-by-wire drive disc; the control-by-wire drive disc is provided with a friction driving end face; the centrifugal ball arm hollow disc is provided with a plurality of centrifugal ball arm holders which are evenly arranged in the circumferential direction at its other end, the centrifugal ball arm holders each having one centrifugal ball arm pin fixedly mounted thereon; the centrifugal ball arm has one end mounted on the intermediate journal of the centrifugal ball arm pin by its smooth bearing hole and is rotatable freely around the centrifugal ball arm pin; the centrifugal ball arm has the other end provided with one centrifugal ball socket, in each of which a centrifugal ball is provided and capable of rolling freely.

The thrust pressing disc has one end face being a smooth end surface, on which the centrifugal ball each abuts against, and further has outer-spline grooves provided on its outer circumferential surface; the outer-spline grooves of the thrust pressing disc is axially in sliding engagement with the inner-spline grooves of the driven inner-spline hub.

The magnetic conductive force transmitting disk is fixedly mounted on the journal of the drive shaft by a bearing hole of the center inner hub of magnetic conductive force transmitting disk; the magnetic conductive force transmitting disk is provided with an outer disc of magnetic conductive force transmitting disk.

One brushless control-by-wire centrifugal ball arm engagement device, as the power transmission engagement device for the first gear, is provided between the input gear of first gear and the driving gear of first gear; one end of the drive shaft of the brushless control-by-wire centrifugal ball arm engagement device is connected to the input gear of first gear; said brushless electromagnet of first gear is provided between the brushless control-by-wire centrifugal ball arm engagement device and the input gear of first gear.

One brushless control-by-wire centrifugal ball arm engagement device, as the power transmission engagement device for the second gear, is provided between the input gear of second gear and the driving gear of second gear; one end of the drive shaft of the brushless control-by-wire centrifugal ball arm engagement device is connected to the input gear of second gear; said brushless electromagnet of second gear is provided between the brushless control-by-wire centrifugal ball arm engagement device and the input gear of second gear.

One brushless control-by-wire centrifugal ball arm engagement device, as the power transmission engagement device for the third gear, is provided between the input gear of third gear and the driving gear of third gear; one end of the drive shaft of the brushless control-by-wire centrifugal ball arm engagement device is connected to the input gear of third gear; said brushless electromagnet of third gear is provided between the brushless control-by-wire centrifugal ball arm engagement device and the input gear of third gear.

One brushless control-by-wire centrifugal ball arm engagement device, as the power transmission engagement device for the fourth gear, is provided between the input gear and the output shaft; one end of the drive shaft of the brushless control-by-wire centrifugal ball arm engagement device is connected to one end of the input shaft; said brushless electromagnet of fourth gear is provided between the brushless control-by-wire centrifugal ball arm engagement device and the input gear.

One brushless control-by-wire centrifugal ball arm engagement device, as the power transmission engagement device for the fifth gear, is provided between the input gear of fifth gear and the driving gear of fifth gear; one end of the drive shaft of the brushless control-by-wire centrifugal ball arm engagement device is connected to the input gear of fifth gear; said brushless electromagnet of fifth gear is provided between the brushless control-by-wire centrifugal ball arm engagement device and the input gear of fifth gear.

One brushless control-by-wire centrifugal ball arm engagement device, as the power transmission engagement device for the sixth gear, is provided between the input gear of sixth gear and the driving gear of sixth gear; one end of the drive shaft of the brushless control-by-wire centrifugal ball arm engagement device is connected to the input gear of sixth gear; said brushless electromagnet of sixth gear is provided between the brushless control-by-wire centrifugal ball arm engagement device and the input gear of sixth gear.

One brushless control-by-wire centrifugal ball arm engagement device, as the power transmission engagement device for the reverse gear, is provided between the input gear of reverse gear and the driving gear of reverse gear; one end of the drive shaft of the brushless control-by-wire centrifugal ball arm engagement device is connected to the input gear of reverse gear; said brushless electromagnet of reverse gear is provided between the brushless control-by-wire centrifugal ball arm engagement device and the input gear of reverse gear.

The brushless electromagnet of first gear, the brushless electromagnet of second gear, the brushless electromagnet of third gear, the brushless electromagnet of fourth gear, the brushless electromagnet of fifth gear, the brushless electromagnet of sixth gear and the brushless electromagnet of reverse gear are all fixedly mounted on a transmission housing by a non-magnetic conductive material.

The end face of magnetic pole of said brushless electromagnet of first gear always keeps an air gap from the opposite end face of the outer disc of magnetic conductive force transmitting disk of the brushless control-by-wire centrifugal ball arm engagement device as the power transmission device for the first gear; when said brushless electromagnet of first gear is deenergized, the friction driving end face of the control-by-wire drive disc of the brushless control-by-wire centrifugal ball arm engagement device as the power transmission device for the first gear keeps an air gap from an end face of the outer disc of magnetic conductive force transmitting disk of the brushless control-by-wire centrifugal ball arm engagement device as the power transmission device for the first gear, by the action of the elastic force of the preloading spring of the brushless control-by-wire centrifugal ball arm engagement device as the power transmission device for the first gear; when said brushless electromagnet of first gear is energized, the friction driving end face of the control-by-wire drive disc of the brushless control-by-wire centrifugal ball arm engagement device as the power transmission device for the first gear is engaged together with an end face of the outer disc of magnetic conductive force transmitting disk of the brushless control-by-wire centrifugal ball arm engagement device as the power transmission device for the first gear, by counteracting the action of the elastic force of the preloading spring of the brushless control-by-wire centrifugal ball arm engagement device as the power transmission device for the first gear.

The end face of magnetic pole of said brushless electromagnet of second gear always keeps an air gap from the opposite end face of the outer disc of magnetic conductive force transmitting disk of the brushless control-by-wire centrifugal ball arm engagement device as the power transmission device for the second gear; when said brushless electromagnet of second gear is deenergized, the friction driving end face of the control-by-wire drive disc of the brushless control-by-wire centrifugal ball arm engagement device as the power transmission device for the second gear keeps an air gap from an end face of the outer disc of magnetic conductive force transmitting disk of the brushless control-by-wire centrifugal ball arm engagement device as the power transmission device for the second gear, by the action of the elastic force of the preloading spring of the brushless control-by-wire centrifugal ball arm engagement device as the power transmission device for the second gear; when said brushless electromagnet of second gear is energized, the friction driving end face of the control-by-wire drive disc of the brushless control-by-wire centrifugal ball arm engagement device as the power transmission device for the second gear is engaged together with an end face of the outer disc of magnetic conductive force transmitting disk of the brushless control-by-wire centrifugal ball arm engagement device as the power transmission device for the second gear, by counteracting the action of the elastic force of the preloading spring of the brushless control-by-wire centrifugal ball arm engagement device as the power transmission device for the second gear.

The end face of magnetic pole of said brushless electromagnet of third gear always keeps an air gap from the opposite end face of the outer disc of magnetic conductive force transmitting disk of the brushless control-by-wire centrifugal ball arm engagement device as the power transmission device for the third gear; when said brushless electromagnet of third gear is deenergized, the friction driving end face of the control-by-wire drive disc of the brushless control-by-wire centrifugal ball arm engagement device as the power transmission device for the third gear keeps an air gap from an end face of the outer disc of magnetic conductive force transmitting disk of the brushless control-by-wire centrifugal ball arm engagement device as the power transmission device for the third gear, by the action of the elastic force of the preloading spring of the brushless control-by-wire centrifugal ball arm engagement device as the power transmission device for the third gear; when said brushless electromagnet of third gear is energized, the friction driving end face of the control-by-wire drive disc of the brushless control-by-wire centrifugal ball arm engagement device as the power transmission device for the third gear is engaged together with an end face of the outer disc of magnetic conductive force transmitting disk of the brushless control-by-wire centrifugal ball arm engagement device as the power transmission device for the third gear, by counteracting the action of the elastic force of the preloading spring of the brushless control-by-wire centrifugal ball arm engagement device as the power transmission device for the third gear.

The end face of magnetic pole of said brushless electromagnet of fourth gear always keeps an air gap from the opposite end face of the outer disc of magnetic conductive force transmitting disk of the brushless control-by-wire centrifugal ball arm engagement device as the power transmission device for the fourth gear; when said brushless electromagnet of fourth gear is deenergized, the friction driving end face of the control-by-wire drive disc of the brushless control-by-wire centrifugal ball arm engagement device as the power transmission device for the fourth gear keeps an air gap from an end face of the outer disc of magnetic conductive force transmitting disk of the brushless control-by-wire centrifugal ball arm engagement device as the power transmission device for the fourth gear, by the action of the elastic force of the preloading spring of the brushless control-by-wire centrifugal ball arm engagement device as the power transmission device for the fourth gear; when said brushless electromagnet of fourth gear is energized, the friction driving end face of the control-by-wire drive disc of the brushless control-by-wire centrifugal ball arm engagement device as the power transmission device for the fourth gear is engaged together with an end face of the outer disc of magnetic conductive force transmitting disk of the brushless control-by-wire centrifugal ball arm engagement device as the power transmission device for the fourth gear, by counteracting the action of the elastic force of the preloading spring of the brushless control-by-wire centrifugal ball arm engagement device as the power transmission device for the fourth gear.

The end face of magnetic pole of said brushless electromagnet of fifth gear always keeps an air gap from the opposite end face of the outer disc of magnetic conductive force transmitting disk of the brushless control-by-wire centrifugal ball arm engagement device as the power transmission device for the fifth gear; when said brushless electromagnet of fifth gear is deenergized, the friction driving end face of the control-by-wire drive disc of the brushless control-by-wire centrifugal ball arm engagement device as the power transmission device for the fifth gear keeps an air gap from an end face of the outer disc of magnetic conductive force transmitting disk of the brushless control-by-wire centrifugal ball arm engagement device as the power transmission device for the fifth gear, by the action of the elastic force of the preloading spring of the brushless control-by-wire centrifugal ball arm engagement device as the power transmission device for the fifth gear; when said brushless electromagnet of fifth gear is energized, the friction driving end face of the control-by-wire drive disc of the brushless control-by-wire centrifugal ball arm engagement device as the power transmission device for the fifth gear is engaged together with an end face of the outer disc of magnetic conductive force transmitting disk of the brushless control-by-wire centrifugal ball arm engagement device as the power transmission device for the fifth gear, by counteracting the action of the elastic force of the preloading spring of the brushless control-by-wire centrifugal ball arm engagement device as the power transmission device for the fifth gear.

The end face of magnetic pole of said brushless electromagnet of sixth gear always keeps an air gap from the opposite end face of the outer disc of magnetic conductive force transmitting disk of the brushless control-by-wire centrifugal ball arm engagement device as the power transmission device for the sixth gear; when said brushless electromagnet of sixth gear is deenergized, the friction driving end face of the control-by-wire drive disc of the brushless control-by-wire centrifugal ball arm engagement device as the power transmission device for the sixth gear keeps an air gap from an end face of the outer disc of magnetic conductive force transmitting disk of the brushless control-by-wire centrifugal ball arm engagement device as the power transmission device for the sixth gear, by the action of the elastic force of the preloading spring of the brushless control-by-wire centrifugal ball arm engagement device as the power transmission device for the sixth gear; when said brushless electromagnet of sixth gear is energized, the friction driving end face of the control-by-wire drive disc of the brushless control-by-wire centrifugal ball arm engagement device as the power transmission device for the sixth gear is engaged together with an end face of the outer disc of magnetic conductive force transmitting disk of the brushless control-by-wire centrifugal ball arm engagement device as the power transmission device for the sixth gear, by counteracting the action of the elastic force of the preloading spring of the brushless control-by-wire centrifugal ball arm engagement device as the power transmission device for the sixth gear.

The end face of magnetic pole of said brushless electromagnet of reverse gear always keeps an air gap from the opposite end face of the outer disc of magnetic conductive force transmitting disk of the brushless control-by-wire centrifugal ball arm engagement device as the power transmission device for the reverse gear; when said brushless electromagnet of reverse gear is deenergized, the friction driving end face of the control-by-wire drive disc of the brushless control-by-wire centrifugal ball arm engagement device as the power transmission device for the reverse gear keeps an air gap from an end face of the outer disc of magnetic conductive force transmitting disk of the brushless control-by-wire centrifugal ball arm engagement device as the power transmission device for the reverse gear, by the action of the elastic force of the preloading spring of the brushless control-by-wire centrifugal ball arm engagement device as the power transmission device for the reverse gear; when said brushless electromagnet of reverse gear is energized, the friction driving end face of the control-by-wire drive disc of the brushless control-by-wire centrifugal ball arm engagement device as the power transmission device for the reverse gear is engaged together with an end face of the outer disc of magnetic conductive force transmitting disk of the brushless control-by-wire centrifugal ball arm engagement device as the power transmission device for the reverse gear, by counteracting the action of the elastic force of the preloading spring of the brushless control-by-wire centrifugal ball arm engagement device as the power transmission device for the reverse gear.

Compared with the prior art, the present invention has the following advantages:

(1) the six-gear automatic transmission for automobile with a brushless control-by-wire centrifugal ball arm engagement device according to the present invention eliminates the hydraulic system and shifting mechanism of a conventional automatic transmission by adopting a brushless control-by-wire centrifugal ball arm engagement device, whose gear shifting process is performed by using an electronic control unit to control the on-off of the current in an electromagnetic coil of a centrifugal ball arm engagement device in a X-by-wire way, which has the advantages of simple structure, low cost and low operational energy consumption.

(2) the brushless control-by-wire centrifugal ball arm engagement device for each gear according to the invention propels a friction disk and a steel disk to be engaged frictionally by utilizing great centrifugal force generated by the centrifugal ball arm of each gear in high-speed operation. It has the advantage of large transmission torque, high speed, no impact during engagement and smooth gear shifting.

REFERENCE NUMBERS

Figure 1:
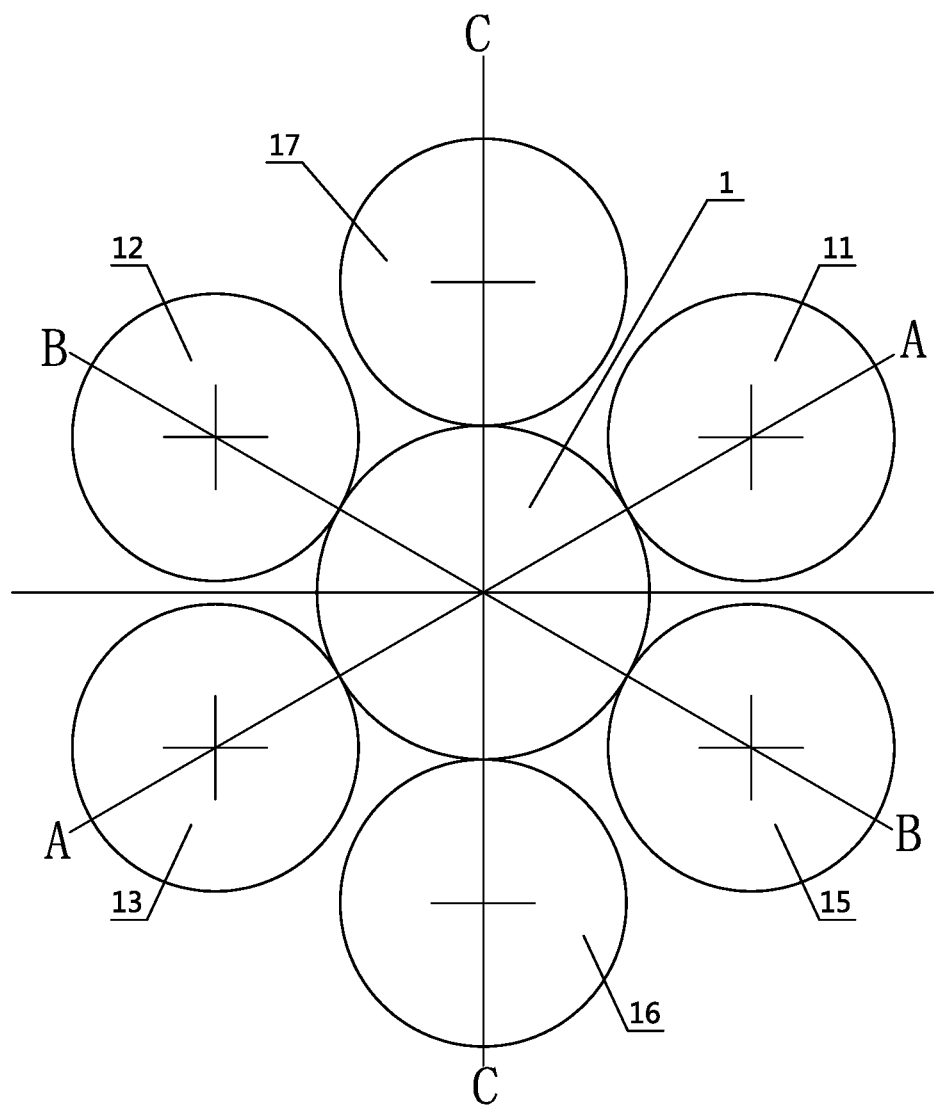
FIG. 1 is a position distribution diagram for input gears of each gear of the six-gear automatic transmission for automobile with a brushless control-by-wire centrifugal ball arm engagement device according to an embodiment of the present invention.

1 input gear, 1Z input shaft, 1WT brushless electromagnet of first gear, 2WT brushless electromagnet of second gear, 3WT brushless electromagnet of third gear, 4WT brushless electromagnet of fourth gear, 5WT brushless electromagnet of fifth gear, 6WT brushless electromagnet of sixth gear, 7WT brushless electromagnet of reverse gear, 2A driven gear of first gear, 2B driven gear of second gear, 2C driven gear of third gear, 2E driven gear of fifth gear, 2F driven gear of sixth gear, 2R driven gear of reverse gear, 2Z output shaft, 10 brushless control-by-wire centrifugal ball arm engagement devices, 10a inner-spline-groove friction discs, 10b outer-spline-groove steel sheets, 10c thrust pressing disc, 10ca smooth surface, 10d driven inner-spline hub, 10e end cover of driven inner-spline hub, 10f locking disc, 10g control-by-wire drive disc, 10ga friction driving end face, 10i preloading spring, 10j centrifugal ball arm hollow disc, 10ja outer-spline-grooves of centrifugal ball arm hollow disc, 10k centrifugal ball arm pins, 10l centrifugal ball arms, 10m centrifugal balls, 10p centrifugal ball arm preloading springs, 10q magnetic conductive force transmitting disk, 10qa center hub of magnetic conductive force transmitting disk, 10qb outer disc of magnetic conductive force transmitting disk, 10r centrifugal ball sockets, 10Z drive shaft, 11 input gear of first gear, 12 input gear of second gear, 13 input gear of third gear, 15 input gear of fifth gear, 16 input gear of sixth gear, 17 input gear of reverse gear, 21 driving gear of first gear, 21P first gear shaft connecting disc, 21Z first gear shaft, 22 driving gear of second gear, 22P second gear shaft connecting disc, 22Z second gear shaft, 23 driving gear of third gear, 23P third gear shaft connecting disc, 23Z third gear shaft, 24P output shaft connecting disc, 25 driving gear of fifth gear, 25P fifth gear shaft connecting disc, 25Z fifth gear shaft, 26 driving gear of sixth gear, 26P sixth gear shaft connecting disc, 26Z sixth gear shaft, 27 driving gear of reverse gear, 27P reverse gear shaft connecting disc, 27Z reverse gear shaft, 28 gear of reverse gear.

DETAILED DESCRIPTION

The embodiments of the present invention will now be described in detail with reference to the accompanying drawings in the embodiments of the present invention. It is obvious that the described embodiments are merely some but not all embodiments of the present invention; all the other embodiments derived by those skilled people in the art based on the embodiment of the present invention without making any creative efforts fall into the protection scope of the present invention.

As shown in FIG. 1 to FIG. 4, the six-gear automatic transmission for automobile with a brushless control-by-wire centrifugal ball arm engagement device according to the present invention includes an input shaft 1Z, an output shaft 2Z, an input gear 1, an input gear of first gear 11, an input gear of second gear 12, an input gear of third gear 13, an input gear of fifth gear 15, an input gear of sixth gear 16, an input gear of reverse gear 17, a driving gear of first gear 21, a driving gear of second gear 22, a driving gear of third gear 23, a driving gear of fifth gear 25, a driving gear of sixth gear 26, a driving gear of reverse gear 27; the input gear 1 is fixedly mounted on the input shaft 1Z, and normally engaged with the input gear of first gear 11, the input gear of second gear 12, the input gear of third gear 13, the input gear of fifth gear 15, the input gear of sixth gear 16 and the input gear of reverse gear 17 respectively along its outer circumference, and further includes seven brushless control-by-wire centrifugal ball arm engagement devices 10, a brushless electromagnet of first gear 1WT, a brushless electromagnet of second gear 2WT, a brushless electromagnet of third gear 3WT, a brushless electromagnet of fourth gear 4WT, a brushless electromagnet of fifth gear 5T, a brushless electromagnet of sixth gear 6WT and a brushless electromagnet of reverse gear 7WT.

Figure 5:
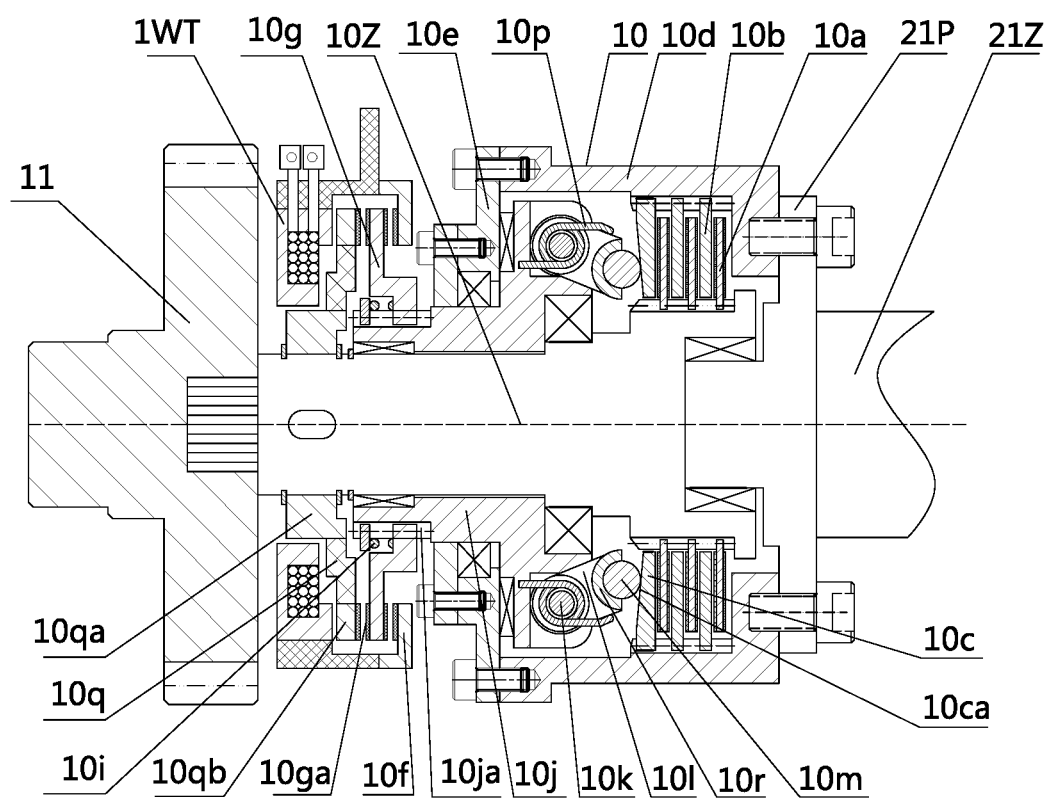
FIG. 5 is a structural diagram of the brushless control-by-wire centrifugal ball arm engagement device as the power transmission device for each gear according to an embodiment of the present invention (taking the first gear as an example).

As shown in FIG. 5, the brushless control-by-wire centrifugal ball arm engagement device 10 each includes inner-spline-groove friction discs 10a, outer-spline-groove steel sheets 10b, a thrust pressing disc 10c, a driven inner-spline hub 10d, an end cover of driven inner-spline hub 10e, a locking disc 10f, a control-by-wire drive disc 10g, a pre-loading spring 10i, a centrifugal ball arm hollow disc 10j, centrifugal ball arm pins 10k, centrifugal ball arms 10l, centrifugal balls 10m, centrifugal ball arm preloading springs 10p, a magnetic conductive force transmitting disk 10q, centrifugal ball sockets 10r and a drive shaft 10Z.

The inner-spline-groove friction discs 10a are sheathed on the outer-spline grooves of the drive shaft 10Z by means of its inner-spline grooves; the outer-spline-groove steel sheets 10b are sheathed on the inner-spline grooves of the driven inner-spline hub 10d by its outer-spline grooves; the thrust pressing disc 10c has one end face being a smooth surface 10ca, and has the other end face being a rough friction surface; on the outer circumferential surface, the thrust pressing disc 10c is further provided with outer-spline grooves which are axially in sliding engagement with the inner-spline grooves of the driven inner-spline hub 10d; the centrifugal ball arm hollow disc 10j is rotatably supported on the drive shaft 10Z by a bearing, and is provided with outer-spline grooves of centrifugal ball arm hollow disc 10ja on the outer circumferential surface of its one end, with the control-by-wire drive disc 10g being arranged on the outer-spline grooves of centrifugal ball arm hollow disc 10ja by its inner-spline grooves and being provided with a friction driving end face 10ga; the centrifugal ball arm hollow disc 10j is provided with a plurality of centrifugal ball arm holders which are evenly arranged in the circumferential direction at its other end, the centrifugal ball arm holders each having one centrifugal ball arm pin 10k fixedly mounted thereon; the centrifugal ball arm 10l has one end mounted on the intermediate journal of the centrifugal ball arm pin 10k by its smooth bearing hole and is rotatable freely around the centrifugal ball arm pin 10k, the centrifugal ball arm 10l has the other end provided with one centrifugal ball socket 10r, in each of which a centrifugal ball 10m is provided and capable of rolling freely; the magnetic conductive force transmitting disk 10q is fixedly mounted on the journal of the drive shaft 10Z by a bearing hole of the center hub of magnetic conductive force transmitting disk 10qa; the magnetic conductive force transmitting disk 10q is provided with an outer disc of magnetic conductive force transmitting disk 10qb.

As shown in FIG. 2 to FIG. 5, one brushless control-by-wire centrifugal ball arm engagement device 10, as the power transmission engagement device for the first gear, is provided between the input gear of first gear 11 and the driving gear of first gear 21, the drive shaft 10Z of the brushless control-by-wire centrifugal ball arm engagement device 10 having one end connected to one end of the input gear of first gear 11 by a spline, and the other end connected to the front journal of the first gear shaft 21Z by a bearing; the driven inner-spline hub 10d of the brushless control-by-wire centrifugal ball arm engagement device 10 has one end, which is close to the input gear for first gear 11, fixedly connected to the end cover of driven inner-spline hub 10e of the brushless control-by-wire centrifugal ball arm engagement device 10 by bolts, and has the other end, which is away from the input gear of first gear 11, fixedly connected to the first gear shaft connecting disc 21P; said brushless electromagnet of first gear 1WT is provided between the brushless control-by-wire centrifugal ball arm engagement device 10 and the input gear of first gear 11; the locking disk 10f of the brushless control-by-wire centrifugal ball arm engagement device 10 and the brushless electromagnet of first gear 1WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of first gear 1WT; when said brushless electromagnet of first gear 1WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of first gear 1WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the second gear, is provided between the input gear of second gear 12 and the driving gear of second gear 22, the drive shaft 10Z of the brushless control-by-wire centrifugal ball arm engagement device 10 having one end connected to one end of the input gear of second gear 12 by a spline, and the other end connected to the front journal of the second gear shaft 22Z by a bearing; the driven inner-spline hub 10d of the brushless control-by-wire centrifugal ball arm engagement device 10 has one end, which is close to the input gear for second gear 12, fixedly connected to the end cover of driven inner-spline hub 10e of the brushless control-by-wire centrifugal ball arm engagement device 10 by bolts, and has the other end, which is away from the input gear of second gear 12, fixedly connected to the second gear shaft connecting disc 22P; said brushless electromagnet of second gear 2WT is provided between the brushless control-by-wire centrifugal ball arm engagement device 10 and the input gear of second gear 12; the locking disk 10f of the brushless control-by-wire centrifugal ball arm engagement device 10 and the brushless electromagnet of second gear 2WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of second gear 2WT;

when said brushless electromagnet of second gear 2WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of second gear 2WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the third gear, is provided between the input gear of third gear 13 and the driving gear of third gear 23, the drive shaft 10Z of the brushless control-by-wire centrifugal ball arm engagement device 10 having one end connected to one end of the input gear of third gear 13 by a spline, and the other end connected to the front journal of the third gear shaft 23Z by a bearing; the driven inner-spline hub 10d of the brushless control-by-wire centrifugal ball arm engagement device 10 has one end, which is close to the input gear for third gear 13, fixedly connected to the end cover of driven inner-spline hub 10e of the brushless control-by-wire centrifugal ball arm engagement device 10 by bolts, and has the other end, which is away from the input gear of third gear 13, fixedly connected to the third gear shaft connecting disc 23P; said brushless electromagnet of third gear 3WT is provided between the brushless control-by-wire centrifugal ball arm engagement device 10 and the input gear of third gear 13; the locking disk 10f of the brushless control-by-wire centrifugal ball arm engagement device 10 and the brushless electromagnet of third gear 3WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of third gear 3WT; when said brushless electromagnet of third gear 3WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of third gear 3WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the fourth gear, is provided between the input gear 1 and the output shaft 2Z, the drive shaft 10Z of the brushless control-by-wire centrifugal ball arm engagement device 10 having one end connected to the input gear 1 by a spline, and the other end connected to the front journal of the output shaft 2Z by a bearing; the driven inner-spline hub 10d of the brushless control-by-wire centrifugal ball arm engagement device 10 has one end, which is close to the input gear 1, fixedly connected to the end cover of driven inner-spline hub 10e of the brushless control-by-wire centrifugal ball arm engagement device 10 by bolts, and has the other end, which is away from the input gear 1, fixedly connected to the output shaft connecting disc 24P; said brushless electromagnet of fourth gear 4WT is provided between the brushless control-by-wire centrifugal ball arm engagement device 10 and the input gear 1; the locking disk 10f of the brushless control-by-wire centrifugal ball arm engagement device 10 and the brushless electromagnet of fourth gear 4WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of fourth gear 4WT; when said brushless electromagnet of fourth gear 4WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of fourth gear 4WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the fifth gear, is provided between the input gear of fifth gear 15 and the driving gear of fifth gear 25, the drive shaft 10Z of the brushless control-by-wire centrifugal ball arm engagement device 10 having one end connected to one end of the input gear of fifth gear 15 by a spline, and the other end connected to the front journal of the fifth gear shaft 25Z by a bearing; the driven inner-spline hub 10d of the brushless control-by-wire centrifugal ball arm engagement device 10 has one end, which is close to the input gear for fifth gear 15, fixedly connected to the end cover of driven inner-spline hub 10e of the brushless control-by-wire centrifugal ball arm engagement device 10 by bolts, and has the other end, which is away from the input gear of fifth gear 15, fixedly connected to the fifth gear shaft connecting disc 25P; said brushless electromagnet of fifth gear 5WT is provided between the brushless control-by-wire centrifugal ball arm engagement device 10 and the input gear of fifth gear 15; the locking disk 10f of the brushless control-by-wire centrifugal ball arm engagement device 10 and the brushless electromagnet of fifth gear 5WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of fifth gear 5WT; when said brushless electromagnet of fifth gear 5WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10*qb* of the brushless control-by-wire centrifugal ball arm engagement device 10, by the action of the elastic force of the preloading spring 10*i* of the brushless control-by-wire centrifugal ball arm engagement device 10; when said brushless electromagnet of fifth gear 5WT is energized, the friction driving end face 10*ga* of the control-by-wire drive disc 10*g* of the brushless control-by-wire centrifugal ball arm engagement device 10 is engaged together with an end face of the outer disc of magnetic conductive force transmitting disk 10*qb* of the brushless control-by-wire centrifugal ball arm engagement device 10.

One brushless control-by-wire centrifugal ball arm engagement device 10, as the power transmission engagement device for the sixth gear, is provided between the input gear of sixth gear 16 and the driving gear of sixth gear 26, the drive shaft 10Z of the brushless control-by-wire centrifugal ball arm engagement device 10 having one end connected to one end of the input gear of sixth gear 16 by a spline, and the other end connected to the front journal of the sixth gear shaft 26Z by a bearing; the driven inner-spline hub 10*d* of the brushless control-by-wire centrifugal ball arm engagement device 10 has one end, which is close to the input gear for sixth gear 16, fixedly connected to the end cover of driven inner-spline hub 10*e* of the brushless control-by-wire centrifugal ball arm engagement device 10 by bolts, and has the other end, which is away from the input gear of sixth gear 16, fixedly connected to the sixth gear shaft connecting disc 26P; said brushless electromagnet of sixth gear 6WT is provided between the brushless control-by-wire centrifugal ball arm engagement device 10 and the input gear of sixth gear 16; the locking disk 10*f* of the brushless control-by-wire centrifugal ball arm engagement device 10 and the brushless electromagnet of sixth gear 6WT are fixedly mounted on the transmission housing by a non-magnetic conductive material; the outer disc of magnetic conductive force transmitting disk 10*qb* of the brushless control-by-wire centrifugal ball arm engagement device 10 always keeps an air gap from the end face of magnetic pole of said brushless electromagnet of sixth gear 6WT; when said brushless electromagnet of sixth gear 6WT is deenergized, the friction driving end face 10*ga* of the control-by-wire drive disc 10*g* of the brushless control-by-wire centrifugal ball arm engagement device 10 keeps an air gap from an end face of the outer disc of magnetic conductive force transmitting disk 10*qb* of the brushless control-by-wire centrifugal ball arm engagement device 10, by the action of the elastic force of the preloading spring 10*i* of the brushless control-by-wire centrifugal ball arm engagement device 10; when said brushless electromagnet of sixth gear 6WT is energized, the friction driving end face 10*ga* of the control-by-wire drive disc 10*g* of the brushless control-by-wire centrifugal ball arm engagement device 10 is engaged together with an end face of the outer disc of magnetic conductive force transmitting disk 10*qb* of the brushless control-by-wire centrifugal ball arm engagement device 10.

One brushless control-by-wire centrifugal ball arm engagement device 10, as the power transmission engagement device for the reverse gear, is provided between the input gear of reverse gear 17 and the driving gear of reverse gear 27, the drive shaft 10Z of the brushless control-by-wire centrifugal ball arm engagement device 10 having one end connected to one end of the input gear of reverse gear 17 by a spline, and the other end connected to the front journal of the reverse gear shaft 27Z by a bearing; the driven inner-spline hub 10*d* of the brushless control-by-wire centrifugal ball arm engagement device 10 has one end, which is close to the input gear for reverse gear 17, fixedly connected to the end cover of driven inner-spline hub 10*e* of the brushless control-by-wire centrifugal ball arm engagement device 10 by bolts, and has the other end, which is away from the input gear of reverse gear 17, fixedly connected to the reverse gear shaft connecting disc 27P; said brushless electromagnet of reverse gear 7WT is provided between the brushless control-by-wire centrifugal ball arm engagement device 10 and the input gear of reverse gear 17; the locking disk 10*f* of the brushless control-by-wire centrifugal ball arm engagement device 10 and the brushless electromagnet of reverse gear 7WT are fixedly mounted on the transmission housing by a non-magnetic conductive material; the outer disc of magnetic conductive force transmitting disk 10*qb* of the brushless control-by-wire centrifugal ball arm engagement device 10 always keeps an air gap from the end face of magnetic pole of said brushless electromagnet of reverse gear 7WT; when said brushless electromagnet of reverse gear 7WT is deenergized, the friction driving end face 10*ga* of the control-by-wire drive disc 10*g* of the brushless control-by-wire centrifugal ball arm engagement device 10 keeps an air gap from an end face of the outer disc of magnetic conductive force transmitting disk 10*qb* of the brushless control-by-wire centrifugal ball arm engagement device 10, by the action of the elastic force of the preloading spring 10*i* of the brushless control-by-wire centrifugal ball arm engagement device 10; when said brushless electromagnet of reverse gear 7WT is energized, the friction driving end face 10*ga* of the control-by-wire drive disc 10*g* of the brushless control-by-wire centrifugal ball arm engagement device 10 is engaged together with an end face of the outer disc of magnetic conductive force transmitting disk 10*qb* of the brushless control-by-wire centrifugal ball arm engagement device 10.

The driving gear of first gear 21 and the first gear shaft connecting disc 21P are fixedly mounted on the first gear shaft 21Z, with the driving gear of first gear 21 normally engaged with a driven gear of first gear 2A; the driving gear of second gear 22 and the second gear shaft connecting disc 22P are fixedly mounted on the second gear shaft 22Z, with the driving gear of second gear 22 normally engaged with a driven gear of second gear 2B; the driving gear of third gear 23 and the third gear shaft connecting disc 23P are fixedly mounted on the third gear shaft 23Z, with the driving gear of third gear 23 normally engaged with a driven gear of third gear 2C; the output shaft 2Z is fixedly mounted on the output shaft connecting disc 24P; the driving gear of fifth gear 25 and the fifth gear shaft connecting disc 25P are fixedly mounted on the fifth gear shaft 25Z, with the driving gear of fifth gear 25 normally engaged with a driven gear of fifth gear 2E; the driving gear of sixth gear 26 and the sixth gear shaft connecting disc 26P are fixedly mounted on the sixth gear shaft 26Z, with the driving gear of sixth gear 26 normally engaged with a driven gear of sixth gear 2F; the driving gear of reverse gear 27 and the reverse gear shaft connecting disc 27P are fixedly mounted on the reverse gear shaft 27Z, the reverse gear is further provided with the gear of reverse gear 28, the gear of reverse gear 28 is supported on the transmission housing by bearings, the gear of reverse gear 28 is normally engaged with the driving gear of reverse gear 27 and the driven gear of reverse gear 2R.

The driven gear of first gear 2A, the driven gear of second gear 2B, the driven gear of third gear 2C, the driven gear of fifth gear 2E, the driven gear of sixth gear 2F and the driven gear of reverse gear 2R are fixedly mounted on the output shaft 2Z.

In the following, the operation principle of the six-gear automatic transmission for automobile with a brushless control-by-wire centrifugal ball arm engagement device will be further described by taking the first gear control-by-wire automatic transmission as an example.

In case of the first gear power transmission, when the electromagnetic coil of the brushless electromagnet of first gear 1WT is energized, the brushless control-by-wire centrifugal ball arm engagement device 10 as the power transmission engagement device for the first gear is operated, with the electromagnetic coils of other gears all being deenergized meanwhile; after the electromagnetic coil of the brushless electromagnet of first gear 1WT is energized, the electromagnetic attraction force generated by the brushless electromagnet of first gear 1WT is transmitted to the control-by-wire drive disc 10g of the brushless control-by-wire centrifugal ball arm engagement device 10 as the power transmission engagement device for the first gear via the magnetic conductive force transmitting disk 10q of the brushless control-by-wire centrifugal ball arm engagement device 10 as the power transmission engagement device for the first gear, so that the control-by-wire drive disc 10g of the brushless control-by-wire centrifugal ball arm engagement device 10 as the power transmission engagement device for the first gear moves in direction of the brushless electromagnet of first gear 1WT by counteracting the elastic force of the preloading spring 10i of the brushless control-by-wire centrifugal ball arm engagement device 10 as the power transmission engagement device for the first gear, making the friction driving end face 10ga of the brushless control-by-wire centrifugal ball arm engagement device 10 as the power transmission engagement device for the first gear engaged with one end face of the magnetic conductive force transmitting disk 10q of the brushless control-by-wire centrifugal ball arm engagement device 10 as the power transmission engagement device for the first gear, and the friction force generated there between drives the centrifugal ball arm hollow disc 10j of the brushless control-by-wire centrifugal ball arm engagement device 10 as the power transmission engagement device for the first gear to rotate, which further driving each centrifugal ball arm 10l of the brushless control-by-wire centrifugal ball arm engagement device 10 as the power transmission engagement device for the first gear to rotate. Meanwhile, by the action of centrifugal force, each centrifugal ball arm 10l of the brushless control-by-wire centrifugal ball arm engagement device 10 as the power transmission engagement device for the first gear is opened outward around a centrifugal ball arm pin 10k of the brushless control-by-wire centrifugal ball arm engagement device 10 as the power transmission engagement device for the first gear, which making one end provided with the centrifugal ball socket 10r of the brushless control-by-wire centrifugal ball arm engagement device 10 as the power transmission engagement device for the first gear drive the centrifugal ball 10m of the brushless control-by-wire centrifugal ball arm engagement device 10 as the power transmission engagement device for the first gear to make a circular motion outwardly along the smooth surface 10ca of the thrust pressing disk 10c of the brushless control-by-wire centrifugal ball arm engagement device 10 as the power transmission engagement device for the first gear, thereby the centrifugal ball arms 10l of the brushless control-by-wire centrifugal ball arm engagement device 10 as the power transmission engagement device for the first gear generates a centrifugal force along with the centrifugal balls 10m of the brushless control-by-wire centrifugal ball arm engagement device 10 as the power transmission engagement device for the first gear, the component of the centrifugal force in the direction of the central axis of the centrifugal ball arm hollow disc 10j of the brushless control-by-wire centrifugal ball arm engagement device 10 as the power transmission engagement device for the first gear propelling the thrust pressure disc 10c of the brushless control-by-wire centrifugal ball arm engagement device 10 as the power transmission engagement device for the first gear to make an axial movement away from the centrifugal ball arm hollow disc 10j of the brushless control-by-wire centrifugal ball arm engagement device 10 as the power transmission engagement device for the first gear, so that the thrust pressing disc 10c of the brushless control-by-wire centrifugal ball arm engagement device 10 as the power transmission engagement device for the first gear compresses each outer-spline-groove steel sheet 10b of the brushless control-by-wire centrifugal ball arm engagement device 10 as the power transmission engagement device for the first gear and each inner-spline-groove friction disk 10a of the brushless control-by-wire centrifugal ball arm engagement device 10 as the power transmission engagement device for the first gear with each other, the friction force between the outer-spline-groove steel sheets 10b of the brushless control-by-wire centrifugal ball arm engagement device 10 as the power transmission engagement device for the first gear and the inner-spline-groove friction disk 10a of the brushless control-by-wire centrifugal ball arm engagement device 10 as the power transmission engagement device for the first gear allowing the driven inner-spline hub 10d of the brushless control-by-wire centrifugal ball arm engagement device 10 as the power transmission engagement device for the first gear to rotate synchronously along with the drive shaft 10Z of the brushless control-by-wire centrifugal ball arm engagement device 10 as the power transmission engagement device for the first gear, and further allowing the drive shaft 10Z of the brushless control-by-wire centrifugal ball arm engagement device 10 as the power transmission engagement device for the first gear to rotate synchronously with the first gear shaft 21Z, thereby realizing the first gear transmission.

When the electromagnetic coils of the brushless electromagnets for the other gears are deenergized, by the action of the elastic force of the preloading spring 10i of the brushless control-by-wire centrifugal ball arm engagement device 10 as the power transmission engagement device for the other gears, the control-by-wire drive disc 10g of the brushless control-by-wire centrifugal ball arm engagement device 10 as the power transmission engagement device for the other gears is engaged with the locking disc 10f of the brushless control-by-wire centrifugal ball arm engagement device 10 as the power transmission engagement device for the other gears, with the locking disc 10f of the brushless control-by-wire centrifugal ball arm engagement device 10 as the power transmission engagement device for the other gears fixed to the transmission housing by a non-magnetic conductive material, so that the friction force between the control-by-wire drive disc 10g of the brushless control-by-wire centrifugal ball arm engagement device 10 as the power transmission engagement device for the other gears and the centrifugal ball arm hollow disc 10j of the brushless control-by-wire centrifugal ball arm engagement device 10 as the power transmission engagement device after their engagement enables the control-by-wire drive disc 10g of the brushless control-by-wire centrifugal ball arm engagement device 10 as the power transmission engagement device for the other gears and the centrifugal ball arm hollow disc 10j of the brushless control-by-wire centrifugal ball arm engagement device 10 as the power transmission engagement device for the other gears standstill, and the centrifugal ball arms 10*l* of the brushless control-by-wire centrifugal ball arm engagement device 10 as the power transmission engagement device for the other gears are folded inwardly along with the centrifugal balls 10*m* of the brushless control-by-wire centrifugal ball arm engagement device 10 as the power transmission engagement device for the other gears by the twisting of the centrifugal ball arm preloading spring 10*p* of the brushless control-by-wire centrifugal ball arm engagement device 10 as the power transmission engagement device for the other gears, thereby the brushless control-by-wire centrifugal ball arm engagement devices 10 as the power transmission engagement device for the other gears do not transmit power.

With the brushless electromagnet of first gear 1WT fixed to the transmission housing by a non-magnetic conductive material, the brushless electromagnet of first gear 1WT always keeps a constant air gap from the magnetic conductive force transmitting disk 10*q* of the brushless control-by-wire centrifugal ball arm engagement device 10 as the power transmission engagement device for the first gear, thereby said first gear transmission process can be performed by a brushless control-by-wire transmission. At the same time, since the electromagnetic force generated by energizing the electromagnetic coil of the brushless electromagnet of first gear 1WT only controls the centrifugal ball arm hollow disc 10*j* of the brushless control-by-wire centrifugal ball arm engagement device 10 as the power transmission engagement device for the first gear to rotate via the magnetic conductive force transmitting disk 10*q* and the control-by-wire drive disc 10*g* of the brushless control-by-wire centrifugal ball arm engagement device 10 as the power transmission engagement device for the first gear, thus, the power consumption of the brushless electromagnet of first gear 1WT is small, which reduces the operation energy consumption of the brushless control-by-wire centrifugal ball arm engagement device 10 as the power transmission engagement device for the first gear.

The control-by-wire power transmissions of the other gears each have the same working principles as the first gear.

Figure 2:
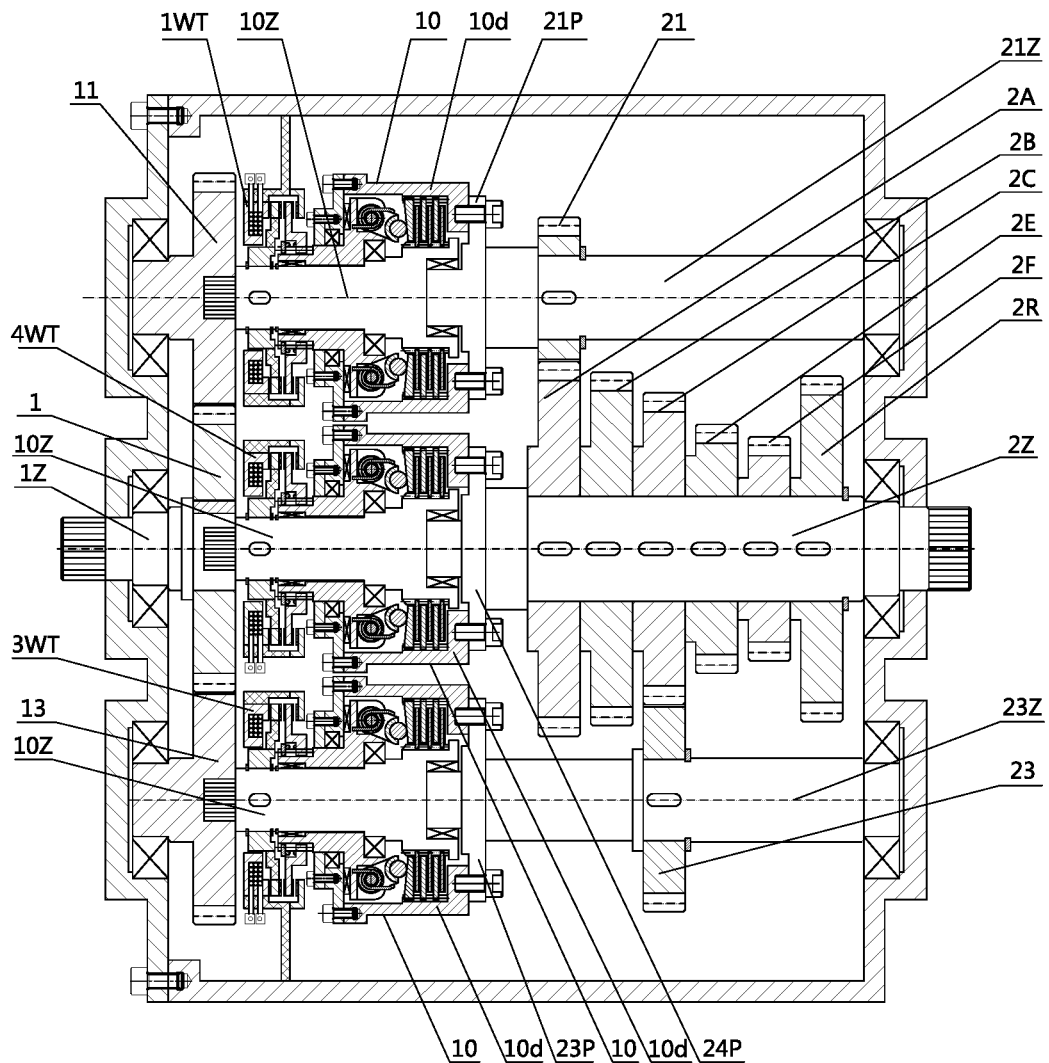
FIG. 2 is a structural diagram of a first gear, a third gear and a fourth gear of the six-gear automatic transmission for automobile with a brushless control-by-wire centrifugal ball arm engagement device according to an embodiment of the present invention (the A-A cross-section of FIG. 1).
Figure 3:
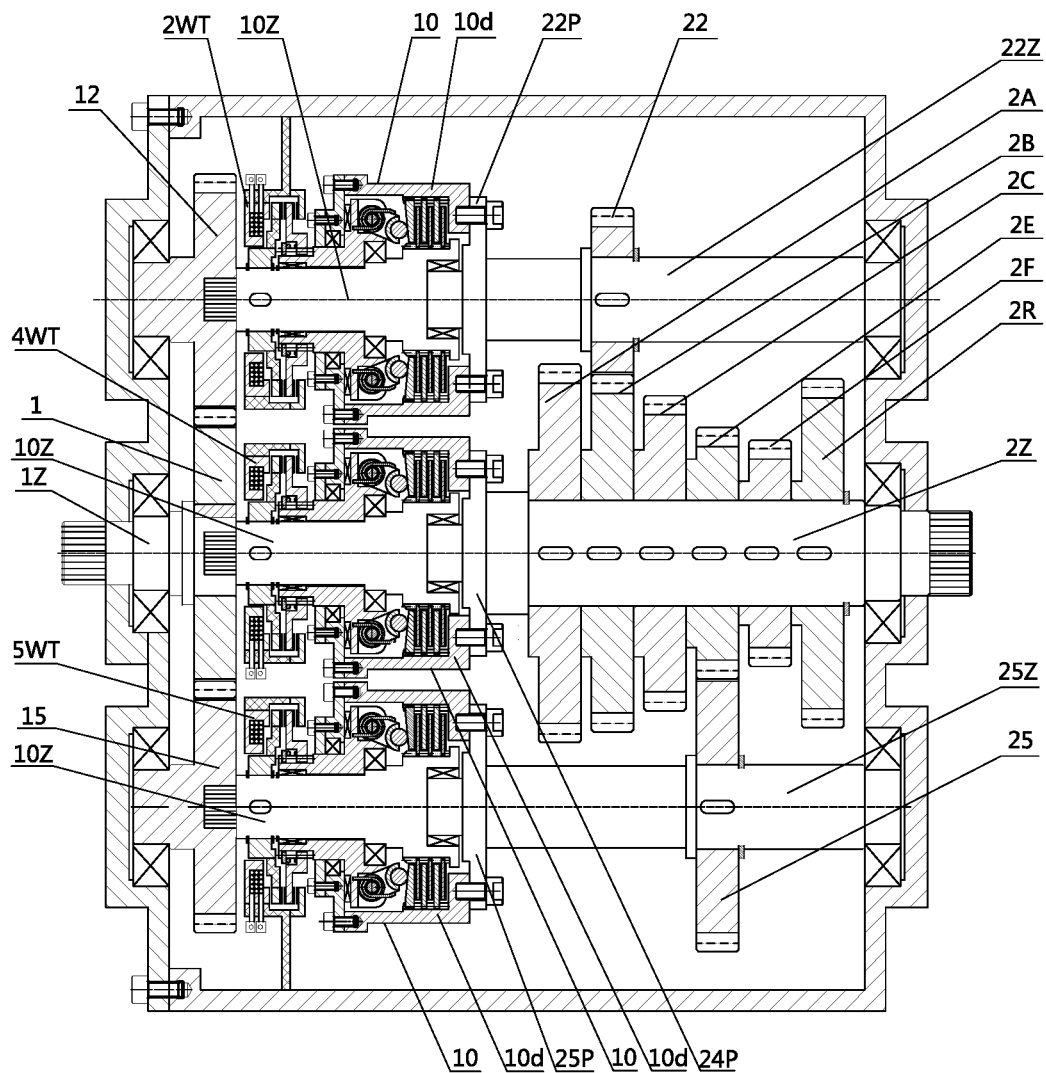
FIG. 3 is a structural diagram of a second gear, a fourth gear and a fifth gear of the six-gear automatic transmission for automobile with a brushless control-by-wire centrifugal ball arm engagement device according to an embodiment of the present invention (the B-B cross-section of FIG. 1).
Figure 4:
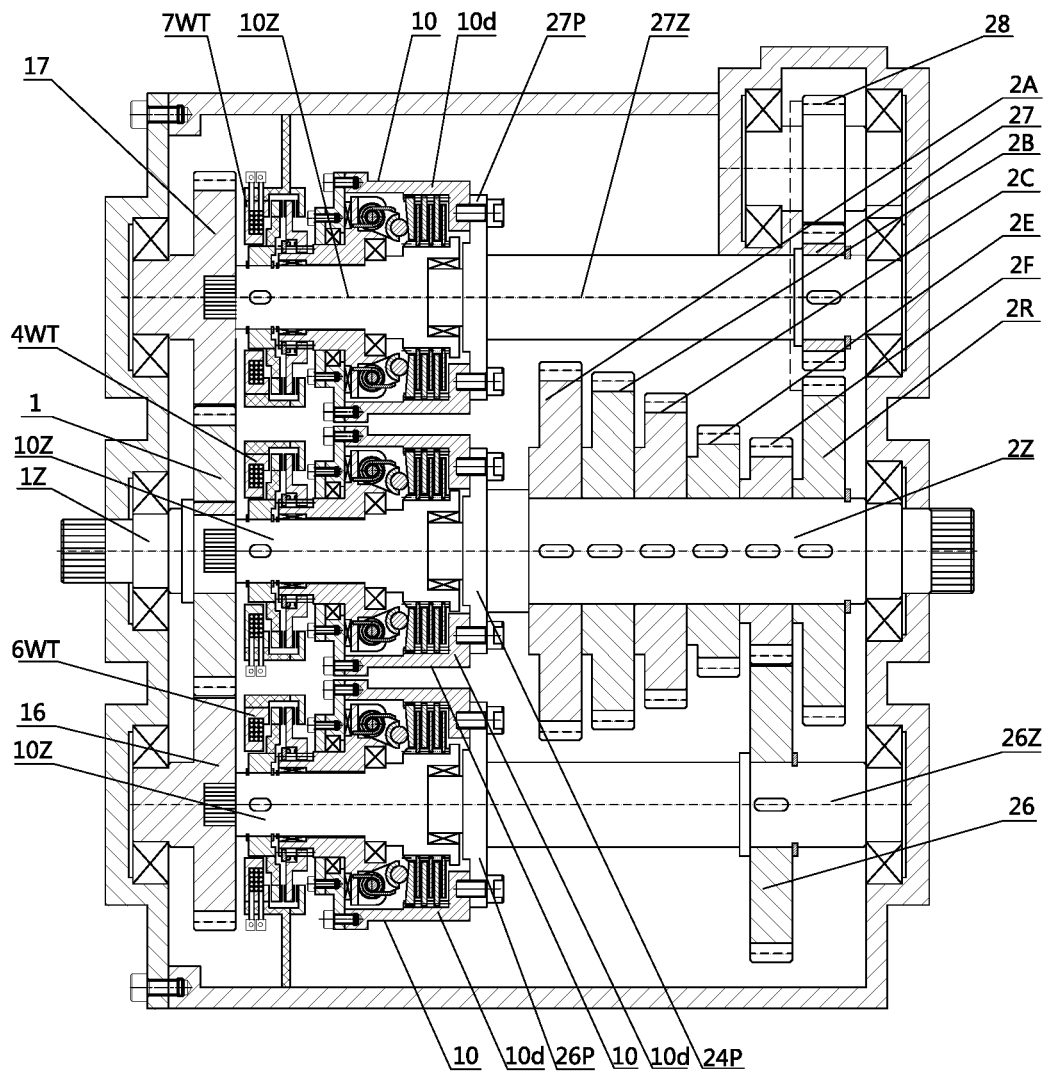
FIG. 4 is a structural diagram of a fourth gear, a sixth gear and a reverse gear of the six-gear automatic transmission for automobile with a brushless control-by-wire centrifugal ball arm engagement device according to an embodiment of the present invention (the C-C cross-section of FIG. 1).

The power transmission path of the six-gear automatic transmission for automobile with a brushless control-by-wire centrifugal ball arm engagement device according to the embodiment of the present invention will be further described below with reference to FIG. 2, FIG. 3 and FIG. 4.

The power transmission path of the first gear: when the brushless control-by-wire centrifugal ball arm engagement device 10 as the power transmission engagement device for the first gear is energized and engaged, the torque of the engine is transmitted to the input gear 1 through the input shaft 1Z; the input gear 1 transmits the torque to the input gear of first gear 11; the input gear of first gear 11 transmits the torque to the brushless control-by-wire centrifugal ball arm engagement device 10 as the power transmission engagement device for the first gear, and the torque is further transmitted to the first gear shaft connecting disc 21P by the brushless control-by-wire centrifugal ball arm engagement device 10 as the power transmission engagement device for the first gear; the power is then transmitted to the output shaft 2Z by the engagement of the driving gear of first gear 21 and the driven gear of first gear 2A, thereby realizing the reducing transmission of the first gear.

The power transmission path of the second gear: when the brushless control-by-wire centrifugal ball arm engagement device 10 as the power transmission engagement device for the second gear is energized and engaged, the torque of the engine is transmitted to the input gear 1 through the input shaft 1Z; the input gear 1 transmits the torque to the input gear of second gear 12; the input gear of second gear 12 transmits the torque to the brushless control-by-wire centrifugal ball arm engagement device 10 as the power transmission engagement device for the second gear, and the torque is further transmitted to the second gear shaft connecting disc 22P by the brushless control-by-wire centrifugal ball arm engagement device 10 as the power transmission engagement device for the second gear; the power is then transmitted to the output shaft 2Z by the engagement of the driving gear of second gear 22 and the driven gear of second gear 2B, thereby realizing the reducing transmission of the second gear.

The power transmission path of the third gear: when the brushless control-by-wire centrifugal ball arm engagement device 10 as the power transmission engagement device for the third gear is energized and engaged, the torque of the engine is transmitted to the input gear 1 through the input shaft 1Z; the input gear 1 transmits the torque to the input gear of third gear 13; the input gear of third gear 13 transmits the torque to the brushless control-by-wire centrifugal ball arm engagement device 10 as the power transmission engagement device for the third gear, and the torque is further transmitted to the third gear shaft connecting disc 23P by the brushless control-by-wire centrifugal ball arm engagement device 10 as the power transmission engagement device for the third gear; the power is then transmitted to the output shaft 2Z by the engagement of the driving gear of third gear 23 and the driven gear of third gear 2C, thereby realizing the reducing transmission of the third gear.

The power transmission path of the fourth gear: when the brushless control-by-wire centrifugal ball arm engagement device 10 as the power transmission engagement device for the fourth gear is energized and engaged, the torque of the engine is transmitted to the input gear 1 through the input shaft 1Z; and the torque is further transmitted to the output shaft 2Z by the brushless control-by-wire centrifugal ball arm engagement device 10 as the power transmission engagement device for the fourth gear, thereby realizing the transmission of the fourth gear.

The power transmission path of the fifth gear: when the brushless control-by-wire centrifugal ball arm engagement device 10 as the power transmission engagement device for the fifth gear is energized and engaged, the torque of the engine is transmitted to the input gear 1 through the input shaft 1Z; the input gear 1 transmits the torque to the input gear of fifth gear 15; the input gear of fifth gear 15 transmits the torque to the brushless control-by-wire centrifugal ball arm engagement device 10 as the power transmission engagement device for the fifth gear, and the torque is further transmitted to the fifth gear shaft connecting disc 25P by the brushless control-by-wire centrifugal ball arm engagement device 10 as the power transmission engagement device for the fifth gear; the power is then transmitted to the output shaft 2Z by the engagement of the driving gear of fifth gear 25 and the driven gear of fifth gear 2E, thereby realizing the accelerating transmission of the fifth gear.

The power transmission path of the sixth gear: when the brushless control-by-wire centrifugal ball arm engagement device 10 as the power transmission engagement device for the sixth gear is energized and engaged, the torque of the engine is transmitted to the input gear 1 through the input shaft 1Z; the input gear 1 transmits the torque to the input gear of sixth gear 16; the input gear of sixth gear 16 transmits the torque to the brushless control-by-wire centrifugal ball arm engagement device 10 as the power transmission engagement device for the sixth gear, and the torque is further transmitted to the sixth gear shaft connecting disc 26P by the brushless control-by-wire centrifugal ball arm engagement device 10 as the power transmission engagement device for the sixth gear; the power is then transmitted to the output shaft 2Z by the engagement of the driving gear of sixth gear 26 and the driven gear of sixth gear 2F, thereby realizing the accelerating transmission of the sixth gear.

The power transmission path of the reverse gear: when the brushless control-by-wire centrifugal ball arm engagement device 10 as the power transmission engagement device for the reverse gear is energized and engaged, the torque of the engine is transmitted to the input gear 1 through the input shaft 1Z; the input gear 1 transmits the torque to the input gear of reverse gear 17; the input gear of reverse gear 17 transmits the torque to the brushless control-by-wire centrifugal ball arm engagement device 10 as the power transmission engagement device for the reverse gear, and through the brushless control-by-wire centrifugal ball arm engagement device 10 as the power transmission engagement device for the reverse gear, the torque is transmitted to the reverse gear shaft 27Z by the reverse gear shaft connecting disc 27P, then the torque is transmitted to the gear of reverse gear 28 by the engagement of the driving gear of reverse gear 27 through the driving gear of reverse gear 27 fixedly mounted on the reverse gear shaft 27Z, finally the torque is transmitted to the output shaft 2Z by the driven gear of reverse gear 2R that engaged with the gear of reverse gear 28 and fixedly mounted on the output shaft 2Z, thereby realizing the reducing transmission of the reverse gear.

Neutral gear: when the brushless control-by-wire centrifugal ball arm engagement device 10 as the power transmission engagement device for the each gear is deenergized and in a non-operating state, the neutral gear is realized.

The embodiments of the present invention are described in detail with reference to the accompanying drawings, but it should be noted that, for those skilled in the art, the present invention is not limited to these embodiments, and improvements and modifications may be made without departing from the gist of the present invention.

The invention claimed is:
1. A six-gear automatic transmission for automobile with a brushless control-by-wire centrifugal ball arm engagement device, which comprises an input shaft (1Z), an output shaft (2Z), a central input gear (1), an input gear of first gear (11), an input gear of second gear (12), an input gear of third gear (13), an input gear of fifth gear (15), an input gear of sixth gear (16), an input gear of reverse gear (17), a driving gear of first gear (21), a driving gear of second gear (22), a driving gear of third gear (23), a driving gear of fifth gear (25), a driving gear of sixth gear (26), a driving gear of reverse gear (27); said central input gear (1) is fixedly mounted on the input shaft (1Z), and engaged with the input gear of first gear (11), the input gear of second gear (12), the input gear of third gear (13), the input gear of fifth gear (15), the input gear of sixth gear (16) and the input gear of reverse gear (17) respectively along outer circumference of the central input gear (1);the six-gear automatic transmission is characterized in that:
  the six-gear automatic transmission further comprises seven brushless control-by-wire centrifugal ball arm engagement devices (10), a brushless electromagnet of first gear (1WT), a brushless electromagnet of second gear (2WT), a brushless electromagnet of third gear (3WT), a brushless electromagnet of fourth gear (4WT), a brushless electromagnet of fifth gear (5WT), a brushless electromagnet of sixth gear (6WT), a brushless electromagnet of reverse gear (7WT);
  the brushless control-by-wire centrifugal ball arm engagement device (10) each comprises a thrust pressing disc (10c), a driven inner-spline hub (10d), a control-by-wire driving disc (10g), a preloading spring (10i), a centrifugal ball arm hollow disc (10j), centrifugal ball arm pins (10k), centrifugal ball arms (10l), centrifugal balls (10m), a magnetic conductive force transmitting disk (10q), centrifugal ball sockets (10r) and a drive shaft (10Z); the centrifugal ball arm hollow disc (10j) is rotatably supported on the drive shaft (10Z) by a bearing, and is provided with outer-spline grooves of centrifugal ball arm hollow disc (10ja) on the outer circumferential surface of one end of the centrifugal ball arm hollow disc (10j); the control-by-wire drive disc (10g) is arranged on the outer-spline grooves of centrifugal ball arm hollow disc (10ja) by inner-spline grooves of the control-by-wire drive disc (10g); the preloading spring (10i) is disposed between the end of the outer-spline grooves of centrifugal ball arm hollow disc (10ja) and an inside end face of the control-by-wire drive disc (10g); the control-by-wire drive disc (10g) is provided with a friction driving end face (10ga); the centrifugal ball arm hollow disc (10j) is provided with a plurality of centrifugal ball arm holders which are evenly arranged in the circumferential direction at other end of the centrifugal ball arm hollow disc (10j), each centrifugal ball arm holders having one of the centrifugal ball arm pins (10k) fixedly mounted thereon; each centrifugal ball arm (10l) has one end mounted on the intermediate journal of one of the centrifugal ball arm pins (10k) by a smooth bearing hole of the centrifugal ball arm (10l) and is rotatable freely around the centrifugal ball arm pin (10k); each centrifugal ball arm (10l) has the other end provided with one of the centrifugal ball sockets (10r), in which one of the centrifugal balls (10m) is provided and capable of rolling freely;
  the thrust pressing disc (10c) has one end face being a smooth end surface (10ca), against which the centrifugal balls (10m) abuts, and further has outer-spline grooves provided on its-outer circumferential surface of the thrust pressing disc (10c); the outer-spline grooves of the thrust pressing disc (10c) is axially in sliding engagement with the inner-spline grooves of the driven inner-spline hub (10d);
  the magnetic conductive force transmitting disk (10q) is fixedly mounted on the journal of the drive shaft (10Z) by a bearing hole of a center inner hub of magnetic conductive force transmitting disk (10qa); the magnetic conductive force transmitting disk (10q) is provided with an outer disc of magnetic conductive force transmitting disk (10qb);
  one brushless control-by-wire centrifugal ball arm engagement device (10), as the power transmission engagement device for the first gear, is provided between the input gear of first gear (11) and the driving gear of first gear (21); one end of the drive shaft (10Z) of the brushless control-by-wire centrifugal ball arm engagement device (10) is connected to the input gear of first gear (11); said brushless electromagnet of first gear (1WT) is provided between the brushless control-by-wire centrifugal ball arm engagement device (10) and the input gear of first gear (11);
  one brushless control-by-wire centrifugal ball arm engagement device (10), as the power transmission engagement device for the second gear, is provided between the input gear of second gear (12) and the driving gear of second gear (22); one end of the drive shaft (10Z) of the brushless control-by-wire centrifugal ball arm engagement device (10) is connected to the input gear of second gear (12); said brushless electromagnet of second gear (2WT) is provided between the brushless control-by-wire centrifugal ball arm engagement device (10) and the input gear of second gear (12);

one brushless control-by-wire centrifugal ball arm engagement device (10), as the power transmission engagement device for the third gear, is provided between the input gear of third gear (13) and the driving gear of third gear (23); one end of the drive shaft (10Z) of the brushless control-by-wire centrifugal ball arm engagement device (10) is connected to the input gear of third gear (13); said brushless electromagnet of third gear (3WT) is provided between the brushless control-by-wire centrifugal ball arm engagement device (10) and the input gear of third gear (13);

one brushless control-by-wire centrifugal ball arm engagement device (10), as the power transmission engagement device for the fourth gear, is provided between the central input gear (1) and the output shaft (2Z); one end of the drive shaft (10Z) of the brushless control-by-wire centrifugal ball arm engagement device (10) is connected to the input shaft (1Z); said brushless electromagnet of fourth gear (4WT) is provided between the brushless control-by-wire centrifugal ball arm engagement device (10) and the central input gear (1);

one brushless control-by-wire centrifugal ball arm engagement device (10), as the power transmission engagement device for the fifth gear, is provided between the input gear of fifth gear (15) and the driving gear of fifth gear (25); one end of the drive shaft (10Z) of the brushless control-by-wire centrifugal ball arm engagement device (10) is connected to the input gear of fifth gear (15); said brushless electromagnet of fifth gear (5WT) is provided between the brushless control-by-wire centrifugal ball arm engagement device (10) and the input gear of fifth gear (15);

one brushless control-by-wire centrifugal ball arm engagement device (10), as the power transmission engagement device for the sixth gear, is provided between the input gear of sixth gear (16) and the driving gear of sixth gear (26); one end of the drive shaft (10Z) of the brushless control-by-wire centrifugal ball arm engagement device (10) is connected to the input gear of sixth gear (16); said brushless electromagnet of sixth gear (6WT) is provided between the brushless control-by-wire centrifugal ball arm engagement device (10) and the input gear of sixth gear (16);

one brushless control-by-wire centrifugal ball arm engagement device (10), as the power transmission engagement device for the reverse gear, is provided between the input gear of reverse gear (17) and the driving gear of reverse gear (27); one end of the drive shaft (10Z) of the brushless control-by-wire centrifugal ball arm engagement device (10) is connected to the input gear of reverse gear (17); said brushless electromagnet of reverse gear (7WT) is provided between the brushless control-by-wire centrifugal ball arm engagement device (10) and the input gear of reverse gear (17); and the brushless electromagnet of first gear (1WT), the brushless electromagnet of second gear (2WT), the brushless electromagnet of third gear (3WT), the brushless electromagnet of fourth gear (4WT), the brushless electromagnet of fifth gear (5WT), the brushless electromagnet of sixth gear (6WT), the brushless electromagnet of reverse gear (7WT) are all fixedly mounted on a transmission housing by a non-magnetic conductive material.

2. The six-gear automatic transmission for automobile with a brushless control-by-wire centrifugal ball arm engagement device according to claim 1, wherein an end face of magnetic pole of said brushless electromagnet of first gear (1WT) always keeps an air gap from an opposite end face of the outer disc of magnetic conductive force transmitting disk (10$qb$) of the brushless control-by-wire centrifugal ball arm engagement device (10) as the power transmission device for the first gear; when said brushless electromagnet of first gear (1WT) is deenergized, the friction driving end face (10$ga$) of the control-by-wire drive disc (10$g$) of the brushless control-by-wire centrifugal ball arm engagement device (10) as the power transmission device for the first gear keeps an air gap from an end face of the outer disc of magnetic conductive force transmitting disk (10$qb$) of the brushless control-by-wire centrifugal ball arm engagement device (10) as the power transmission device for the first gear, by the action of the elastic force of the preloading spring (10$i$) of the brushless control-by-wire centrifugal ball arm engagement device (10) as the power transmission device for the first gear; when said brushless electromagnet of first gear (1WT) is energized, the friction driving end face (10$ga$) of the control-by-wire drive disc (10$g$) of the brushless control-by-wire centrifugal ball arm engagement device (10) as the power transmission device for the first gear is engaged together with an end face of the outer disc of magnetic conductive force transmitting disk (10$qb$) of the brushless control-by-wire centrifugal ball arm engagement device (10) as the power transmission device for the first gear, by counteracting the action of the elastic force of the preloading spring (10$i$) of the brushless control-by-wire centrifugal ball arm engagement device (10) as the power transmission device for the first gear.

3. The six-gear automatic transmission for automobile with a brushless control-by-wire centrifugal ball arm engagement device according to claim 1, wherein an end face of magnetic pole of said brushless electromagnet of second gear (2WT) always keeps an air gap from an opposite end face of the outer disc of magnetic conductive force transmitting disk (10$qb$) of the brushless control-by-wire centrifugal ball arm engagement device (10) as the power transmission device for the second gear; when said brushless electromagnet of second gear (2WT) is deenergized, the friction driving end face (10$ga$) of the control-by-wire drive disc (10$g$) of the brushless control-by-wire centrifugal ball arm engagement device (10) as the power transmission device for the second gear keeps an air gap from an end face of the outer disc of magnetic conductive force transmitting disk (10$qb$) of the brushless control-by-wire centrifugal ball arm engagement device (10) as the power transmission device for the second gear, by the action of the elastic force of the preloading spring (10$i$) of the brushless control-by-wire centrifugal ball arm engagement device (10) as the power transmission device for the second gear; when said brushless electromagnet of second gear (2WT) is energized, the friction driving end face (10*ga*) of the control-by-wire drive disc (10*g*) of the brushless control-by-wire centrifugal ball arm engagement device (10) as the power transmission device for the second gear is engaged together with an end face of the outer disc of magnetic conductive force transmitting disk (10*qb*) of the brushless control-by-wire centrifugal ball arm engagement device (10) as the power transmission device for the second gear, by counteracting the action of the elastic force of the preloading spring (10*i*) of the brushless control-by-wire centrifugal ball arm engagement device (10) as the power transmission device for the second gear.

4. The six-gear automatic transmission for automobile with a brushless control-by-wire centrifugal ball arm engagement device according to claim 1, wherein an end face of magnetic pole of said brushless electromagnet of third gear (3WT) always keeps an air gap from an opposite end face of the outer disc of magnetic conductive force transmitting disk (10*qb*) of the brushless control-by-wire centrifugal ball arm engagement device (10) as the power transmission device for the third gear; when said brushless electromagnet of third gear (3WT) is deenergized, the friction driving end face (10*ga*) of the control-by-wire drive disc (10*g*) of the brushless control-by-wire centrifugal ball arm engagement device (10) as the power transmission device for the third gear keeps an air gap from an end face of the outer disc of magnetic conductive force transmitting disk (10*qb*) of the brushless control-by-wire centrifugal ball arm engagement device (10) as the power transmission device for the third gear, by the action of the elastic force of the preloading spring (10*i*) of the brushless control-by-wire centrifugal ball arm engagement device (10) as the power transmission device for the third gear; when said brushless electromagnet of third gear (3WT) is energized, the friction driving end face (10*ga*) of the control-by-wire drive disc (10*g*) of the brushless control-by-wire centrifugal ball arm engagement device (10) as the power transmission device for the third gear is engaged together with an end face of the outer disc of magnetic conductive force transmitting disk (10*qb*) of the brushless control-by-wire centrifugal ball arm engagement device (10) as the power transmission device for the third gear, by counteracting the action of the elastic force of the preloading spring (10*i*) of the brushless control-by-wire centrifugal ball arm engagement device (10) as the power transmission device for the third gear.

5. The six-gear automatic transmission for automobile with a brushless control-by-wire centrifugal ball arm engagement device according to claim 1, wherein an end face of magnetic pole of said brushless electromagnet of fourth gear (4WT) always keeps an air gap from an opposite end face of the outer disc of magnetic conductive force transmitting disk (10*qb*) of the brushless control-by-wire centrifugal ball arm engagement device (10) as the power transmission device for the fourth gear; when said brushless electromagnet of fourth gear (4WT) is deenergized, the friction driving end face (10*ga*) of the control-by-wire drive disc (10*g*) of the brushless control-by-wire centrifugal ball arm engagement device (10) as the power transmission device for the fourth gear keeps an air gap from an end face of the outer disc of magnetic conductive force transmitting disk (10*qb*) of the brushless control-by-wire centrifugal ball arm engagement device (10) as the power transmission device for the fourth gear, by the action of the elastic force of the preloading spring (10*i*) of the brushless control-by-wire centrifugal ball arm engagement device (10) as the power transmission device for the fourth gear; when said brushless electromagnet of fourth gear (4WT) is energized, the friction driving end face (10*ga*) of the control-by-wire drive disc (10*g*) of the brushless control-by-wire centrifugal ball arm engagement device (10) as the power transmission device for the fourth gear is engaged together with an end face of the outer disc of magnetic conductive force transmitting disk (10*qb*) of the brushless control-by-wire centrifugal ball arm engagement device (10) as the power transmission device for the fourth gear, by counteracting the action of the elastic force of the preloading spring (10*i*) of the brushless control-by-wire centrifugal ball arm engagement device (10) as the power transmission device for the fourth gear.

6. The six-gear automatic transmission for automobile with a brushless control-by-wire centrifugal ball arm engagement device according to claim 1, wherein an end face of magnetic pole of said brushless electromagnet of fifth gear (5WT) always keeps an air gap from an opposite end face of the outer disc of magnetic conductive force transmitting disk (10*qb*) of the brushless control-by-wire centrifugal ball arm engagement device (10) as the power transmission device for the fifth gear; when said brushless electromagnet of fifth gear (5WT) is deenergized, the friction driving end face (10*ga*) of the control-by-wire drive disc (10*g*) of the brushless control-by-wire centrifugal ball arm engagement device (10) as the power transmission device for the fifth gear keeps an air gap from an end face of the outer disc of magnetic conductive force transmitting disk (10*qb*) of the brushless control-by-wire centrifugal ball arm engagement device (10) as the power transmission device for the fifth gear, by the action of the elastic force of the preloading spring (10*i*) of the brushless control-by-wire centrifugal ball arm engagement device (10) as the power transmission device for the fifth gear; when said brushless electromagnet of fifth gear (5WT) is energized, the friction driving end face (10*ga*) of the control-by-wire drive disc (10*g*) of the brushless control-by-wire centrifugal ball arm engagement device (10) as the power transmission device for the fifth gear is engaged together with an end face of the outer disc of magnetic conductive force transmitting disk (10*qb*) of the brushless control-by-wire centrifugal ball arm engagement device (10) as the power transmission device for the fifth gear, by counteracting the action of the elastic force of the preloading spring (10*i*) of the brushless control-by-wire centrifugal ball arm engagement device (10) as the power transmission device for the fifth gear.

7. The six-gear automatic transmission for automobile with a brushless control-by-wire centrifugal ball arm engagement device according to claim 1, wherein an end face of magnetic pole of said brushless electromagnet of sixth gear (6WT) always keeps an air gap from an opposite end face of the outer disc of magnetic conductive force transmitting disk (10*qb*) of the brushless control-by-wire centrifugal ball arm engagement device (10) as the power transmission device for the sixth gear; when said brushless electromagnet of sixth gear (6WT) is deenergized, the friction driving end face (10*ga*) of the control-by-wire drive disc (10*g*) of the brushless control-by-wire centrifugal ball arm engagement device (10) as the power transmission device for the sixth gear keeps an air gap from an end face of the outer disc of magnetic conductive force transmitting disk (10$qb$) of the brushless control-by-wire centrifugal ball arm engagement device (10) as the power transmission device for the sixth gear, by the action of the elastic force of the preloading spring (10$i$) of the brushless control-by-wire centrifugal ball arm engagement device (10) as the power transmission device for the sixth gear; when said brushless electromagnet of sixth gear (6WT) is energized, the friction driving end face (10$ga$) of the control-by-wire drive disc (10$g$) of the brushless control-by-wire centrifugal ball arm engagement device (10) as the power transmission device for the sixth gear is engaged together with an end face of the outer disc of magnetic conductive force transmitting disk (10$qb$) of the brushless control-by-wire centrifugal ball arm engagement device (10) as the power transmission device for the sixth gear, by counteracting the action of the elastic force of the preloading spring (10$i$) of the brushless control-by-wire centrifugal ball arm engagement device (10) as the power transmission device for the sixth gear.

8. The six-gear automatic transmission for automobile with a brushless control-by-wire centrifugal ball arm engagement device according to claim 1, wherein an end face of magnetic pole of said brushless electromagnet of reverse gear (7WT) always keeps an air gap from an opposite end face of the outer disc of magnetic conductive force transmitting disk (10$qb$) of the brushless control-by-wire centrifugal ball arm engagement device (10) as the power transmission device for the reverse gear; when said brushless electromagnet of reverse gear (7WT) is deenergized, the friction driving end face (10$ga$) of the control-by-wire drive disc (10$g$) of the brushless control-by-wire centrifugal ball arm engagement device (10) as the power transmission device for the reverse gear keeps an air gap from an end face of the outer disc of magnetic conductive force transmitting disk (10$qb$) of the brushless control-by-wire centrifugal ball arm engagement device (10) as the power transmission device for the reverse gear, by the action of the elastic force of the preloading spring (10$i$) of the brushless control-by-wire centrifugal ball arm engagement device (10) as the power transmission device for the reverse gear; when said brushless electromagnet of reverse gear (7WT) is energized, the friction driving end face (10$ga$) of the control-by-wire drive disc (10$g$) of the brushless control-by-wire centrifugal ball arm engagement device (10) as the power transmission device for the reverse gear is engaged together with an end face of the outer disc of magnetic conductive force transmitting disk (10$qb$) of the brushless control-by-wire centrifugal ball arm engagement device (10) as the power transmission device for the reverse gear, by counteracting the action of the elastic force of the preloading spring (10$i$) of the brushless control-by-wire centrifugal ball arm engagement device (10) as the power transmission device for the reverse gear.

* * * * *

UNITED STATES PATENT AND TRADEMARK OFFICE
CERTIFICATE OF CORRECTION

| | | |
|---|---|---|
| PATENT NO. | : 11,079,016 B2 | Page 1 of 1 |
| APPLICATION NO. | : 16/075322 | |
| DATED | : August 3, 2021 | |
| INVENTOR(S) | : Jinyu Qu et al. | |

It is certified that error appears in the above-identified patent and that said Letters Patent is hereby corrected as shown below:

On the Title Page

Item [72] Inventors: delete "255012" and insert -- Zibo --.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*